United States Patent [19]

Cochran et al.

[11] 4,121,760
[45] Oct. 24, 1978

[54] ELECTRONIC MULTIBASE CALCULATOR

[75] Inventors: Michael J. Cochran, Richardson; Leonard J. Donohoe, Irving, both of Tex.

[73] Assignee: Texas Instruments Incorporated, Dallas, Tex.

[21] Appl. No.: 684,612

[22] Filed: May 10, 1976

Related U.S. Application Data

[63] Continuation of Ser. No. 429,256, Dec. 28, 1973, abandoned.

[51] Int. Cl.² ............................................. H03K 13/24
[52] U.S. Cl. .............................. 235/311; 340/347 DD; 364/700
[58] Field of Search ..................... 235/155, 156, 168; 340/347 DD, 172.5

[56] References Cited

U.S. PATENT DOCUMENTS

| | | | |
|---|---|---|---|
| 3,495,222 | 2/1970 | Perotto et al. | 340/172.5 |
| 3,579,201 | 5/1971 | Langley | 340/172.5 |
| 3,593,313 | 7/1971 | Tomaszewski et al. | 340/172.5 |
| 3,602,894 | 8/1971 | Igel et al. | 340/172.5 |
| 3,702,988 | 11/1972 | Haney et al. | 340/172.5 |
| 3,748,450 | 7/1973 | Fico et al. | 235/155 |
| 3,748,452 | 7/1973 | Ruben | 235/168 |
| 3,760,171 | 9/1973 | Wang et al. | 235/156 |
| 3,855,461 | 12/1974 | Stockwell | 235/156 |
| 3,882,483 | 5/1975 | Burke et al. | 235/155 X |
| 3,934,229 | 1/1976 | Cochran et al. | 340/172.5 |

OTHER PUBLICATIONS

The Engineering Staff of Analog Devices, Inc., Analog-Digital Conversion Handbook 6/72, pp. III–50, 51.

Primary Examiner—Thomas J. Sloyan
Attorney, Agent, or Firm—Richard P. Berg; Rene' E. Grossman

[57] ABSTRACT

A selectively alterable base numerical system in which a calculator implemented in a few semiconductor chips has a keyboard to enter numeric data and to command functions to be performed on the data by circuitry on the semiconductor chips in a first number base. The results of operations on the data in accordance with a selected function are then available as by way of a display. Circuitry is provided responsive to a keyboard base function input to change the results between number bases, preferably between hexadecimal, octal and decimal. A three chip calculator is provided where a data chip cooperates with two ROM chips and a manual keyboard input unit to permit operation selectively in any of several number bases and to change between bases at any point in a course of operations.

7 Claims, 13 Drawing Figures

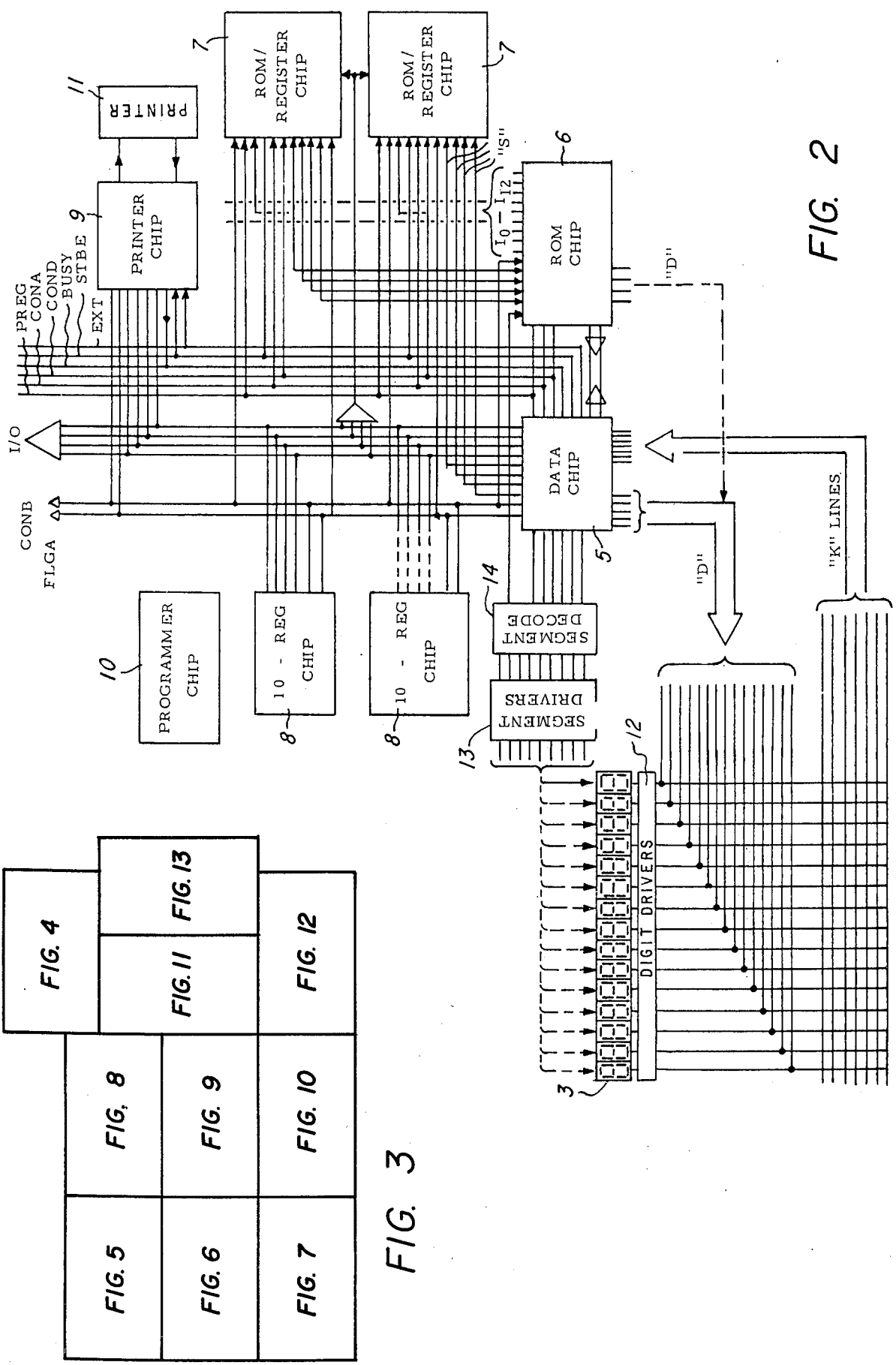

ELECTRONIC MULTIBASE CALCULATOR

This is a continuation of application Ser. No. 429,256, filed Dec. 28, 1973, now abandoned.

This invention relates to a scientific calculator which provides for selective entry and display of numerical data in any one of a plurality of number bases with means automatically to convert any contents of the calculator from one number base to another. The invention provides the foregoing functions in addition to a range of other functions normally provided in scientific calculators.

Electronic desk top calculators and portable hand-held calculators have undergone extensive improvements due to the availability of MOS/LSI chips which allow entire major systems to be embodied in only one or a small number of semiconductor devices. This technology permits large savings in manufacture, labor and material costs and allows calculators to have operating functions not possible at reasonable costs in machines built from discrete devices or from a large number of integrated circuits. A calculator system adapted to be implemented using two MOS/LSI chips is set forth in copending application Ser. No. 607,525, filed Aug. 25, 1975 as a continuation application of Ser. No. 360,984, filed May 16, 1973, now U.S. Pat. No. 3,984,816, assigned to the assignee of this invention. A feature of the calculator disclosed in said application is the manner in which a data chip and a ROM chip cooperate in providing an extended repertoire of function and further, the manner in which the combination of such two chips can accommodate additional chips to expand the memory, the program repertoire and the output functions.

In application Ser. No. 423,355, filed Dec. 10, 1973, now U.S. Pat. No. 3,934,229, a three chip calculator is described and claimed in with a third chip is added to the system of U.S. Pat. No. 3,984,816 and the manner in which the three chips cooperate together is described in detail.

The present invention relates to a three chip calculator embodying the same chips in the same interrelationship as disclosed in U.S. Pat. 3,934,229 in connection with which a different keyboard relationship is established and in which the internal structure of two of the chips is altered by the program in programmable logic arrays contained therein. The programmable logic arrays are described in said application Ser. No. 360,984, abandoned and U.S. Pat. No. 3,934,229.

The present invention may be termed an electronic hexadecimal calculator/converter. It provides the basic functions of the three chip calculator described and claimed in the above prior application and in addition, has circuitry and keyboard capabilities for conducting arithmetic in either decimal, octal or hexadecimal number bases and with a keyboard function input automatically to convert the contents of the calculator at any time to a different number base. A light emitting display of data in the calculator is provided. The display changes to correspond with the change in number base.

More particularly in accordance with the present invention, an alterable base numerical calculator system is provided wherein a calculator implemented on a few semiconductor chips has a keyboard to enter numeric data and to command functions to be performed on the data by circuitry on the chips in a first number base. Means are provided to output the results of operations on the data in accordance with commanded functions. Means are also provided on the calculator responsive to a keyboard base function input to transform the calculator output data to a second or different number base.

In a more specific aspect, means are provided automatically to transform the calculator content between any one of decimal, octal or hexadecimal number bases.

In a more specific aspect, latch circuitry is provided to force all calculations on a calculator subsequent to entry of a second base function to output all results in the second number base. In a further aspect, the calculator has arithmetic circuitry and ROM storage of sets of instructions to perform arithmetic functions in each of several number bases with keyboard actuated means to shift from one set to another. In a further aspect, means are selectively provided responsive to keyboard input to transform contents of the calculator from one base to another while maintaining the ability to continue further calculations in the first number base.

The novel features believed characteristic of the invention are set forth in the appended claims. The invention itself, however, as well as objects and advantages thereof, will best be understood by reference to the following detailed description of an illustrative embodiment taken in conjunction with the accompanying drawings, in which:

FIG. 2 is a simplified block diagram of an expandable calculator system accommodating the present invention;

FIG. 3 is a diagram showing the relationship between the sheets of drawings on which FIGS. 4–13 appear;

FIGURE 1

Figure 1:
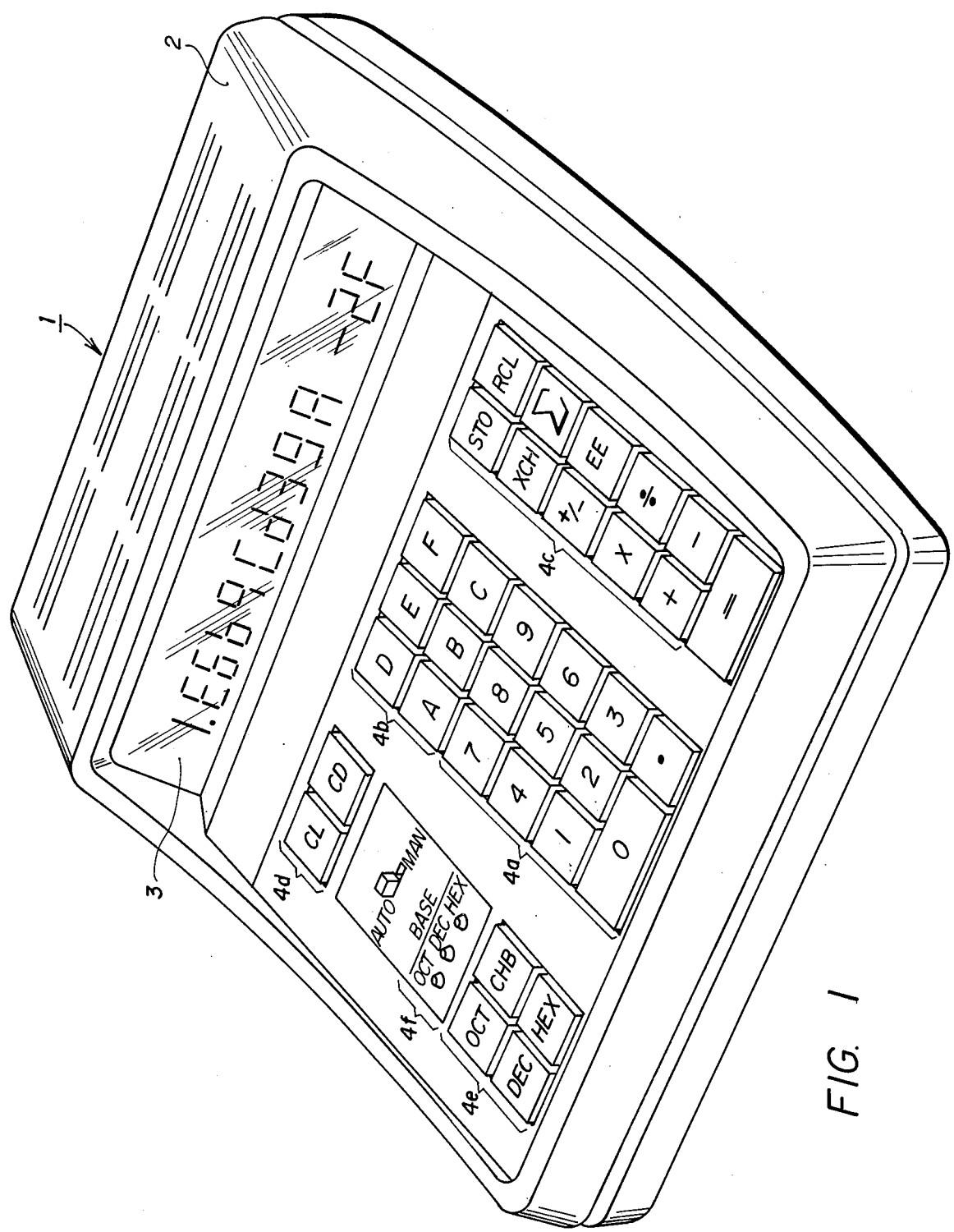
FIG. 1 illustrates one embodiment of the invention.
Figure 4:
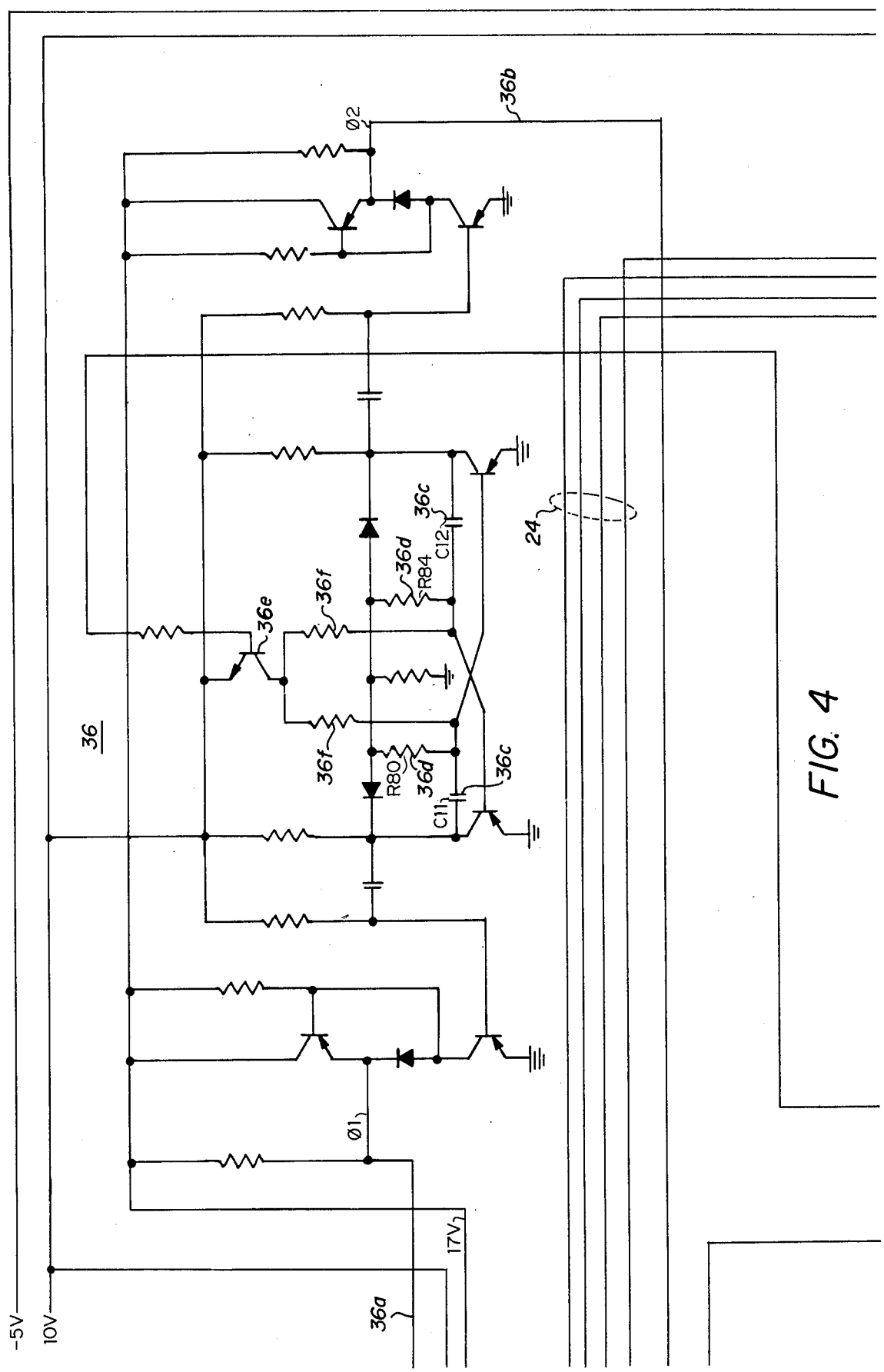
FIGS. 4–13 is a composite diagram illustrating interconnections between the chip, the keyboard and display in accordance with the present invention.
Figure 5:
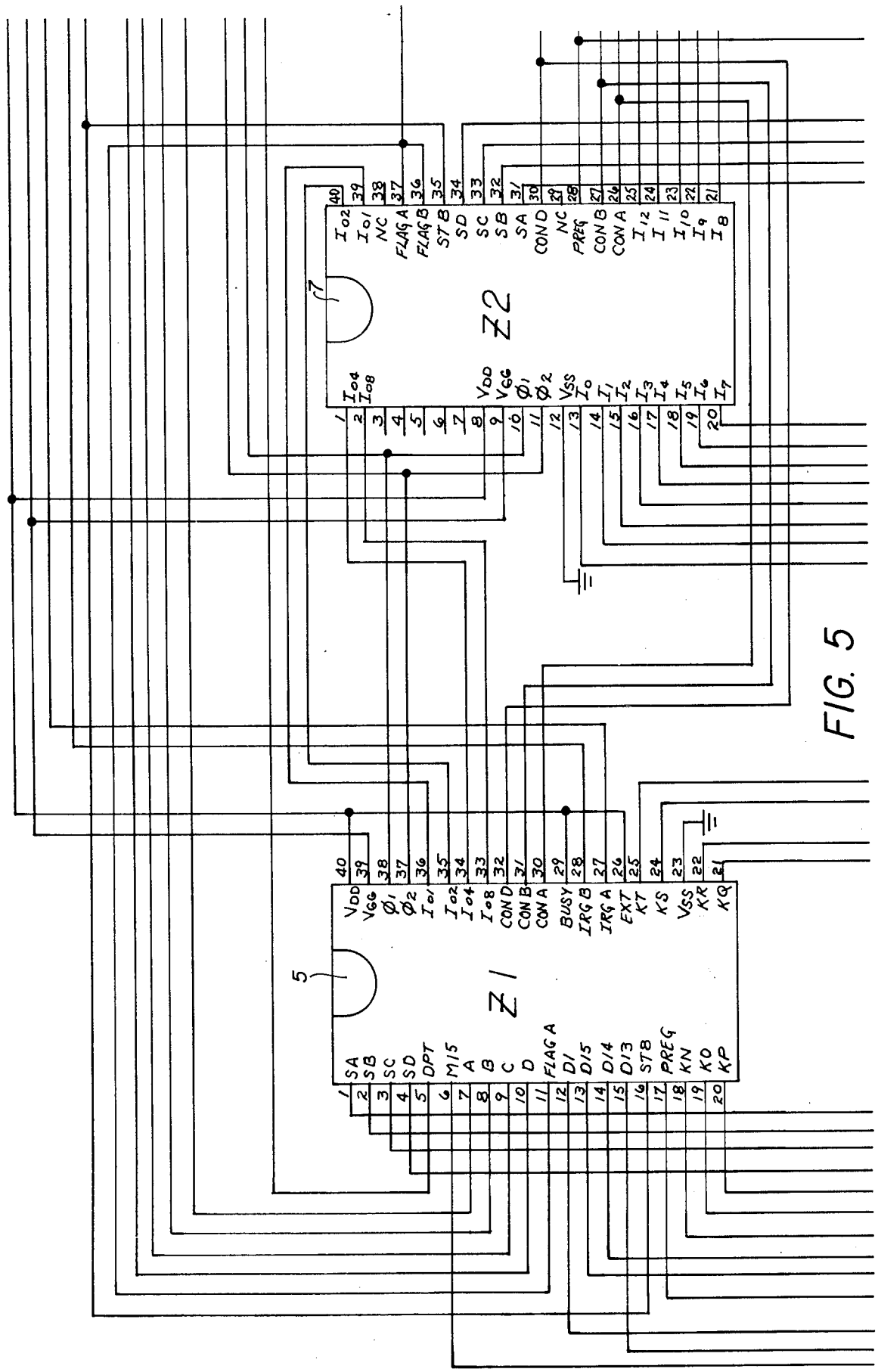
Figure 6:
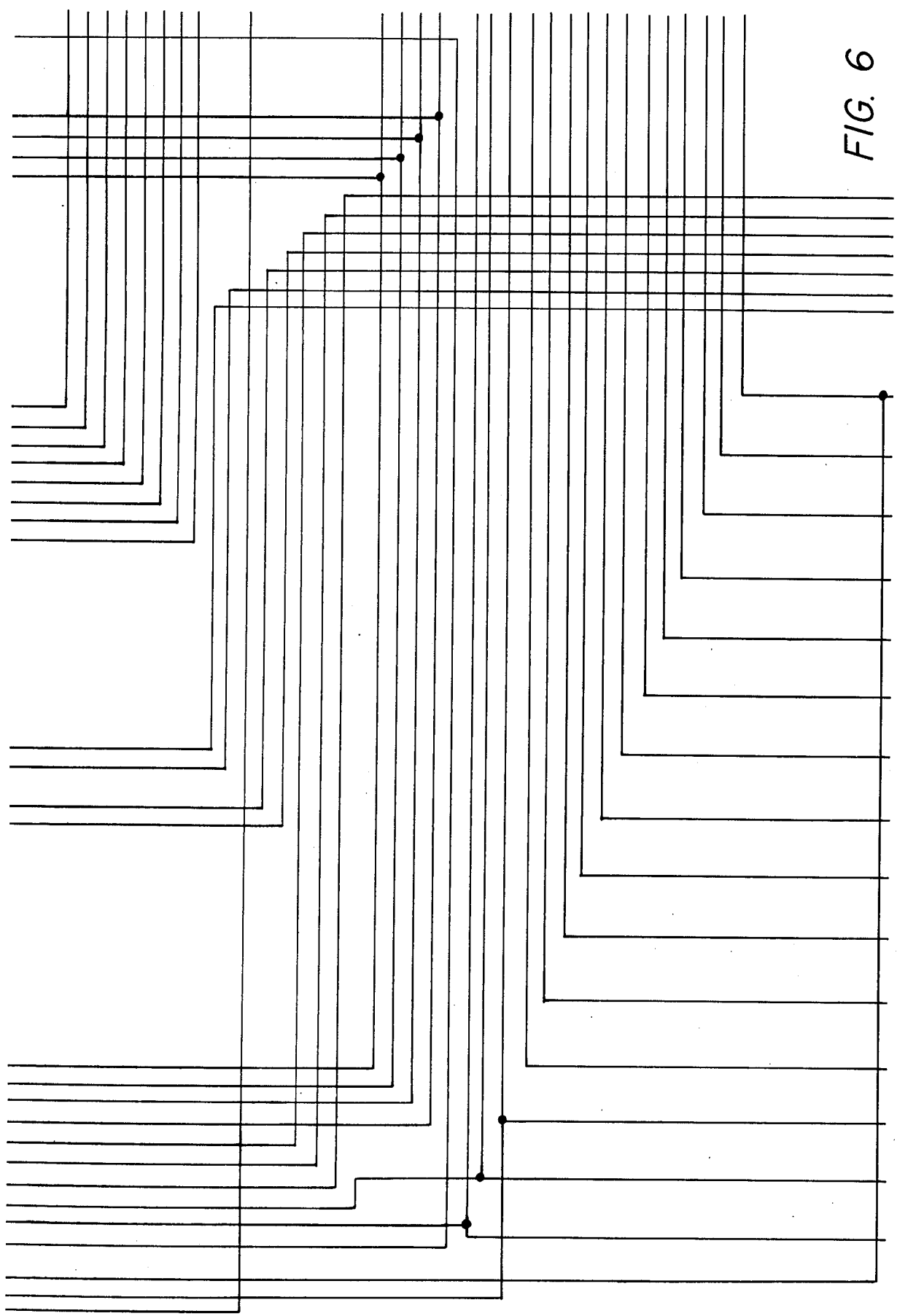
Figure 7:
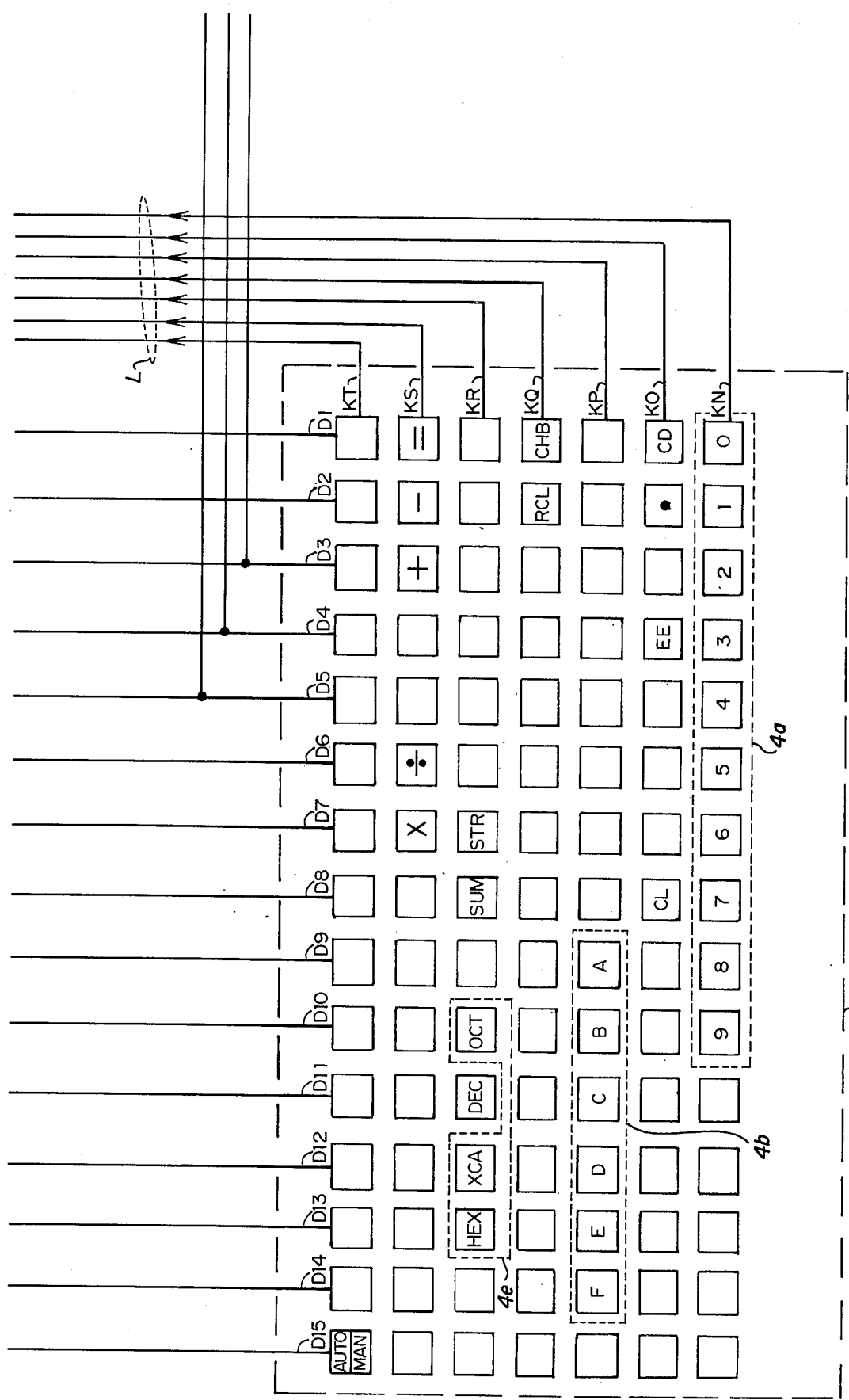
Figure 8:
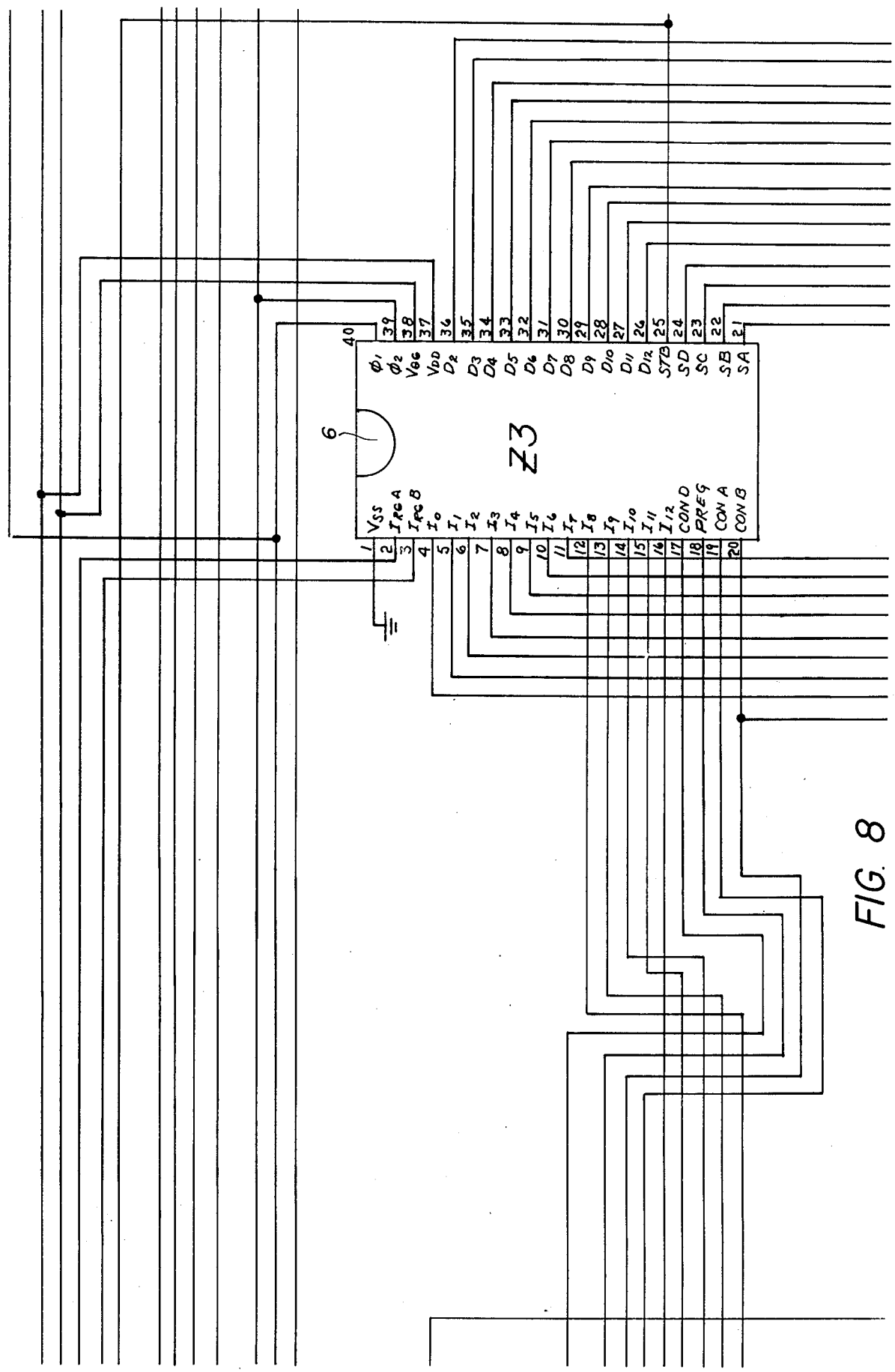
Figure 9:
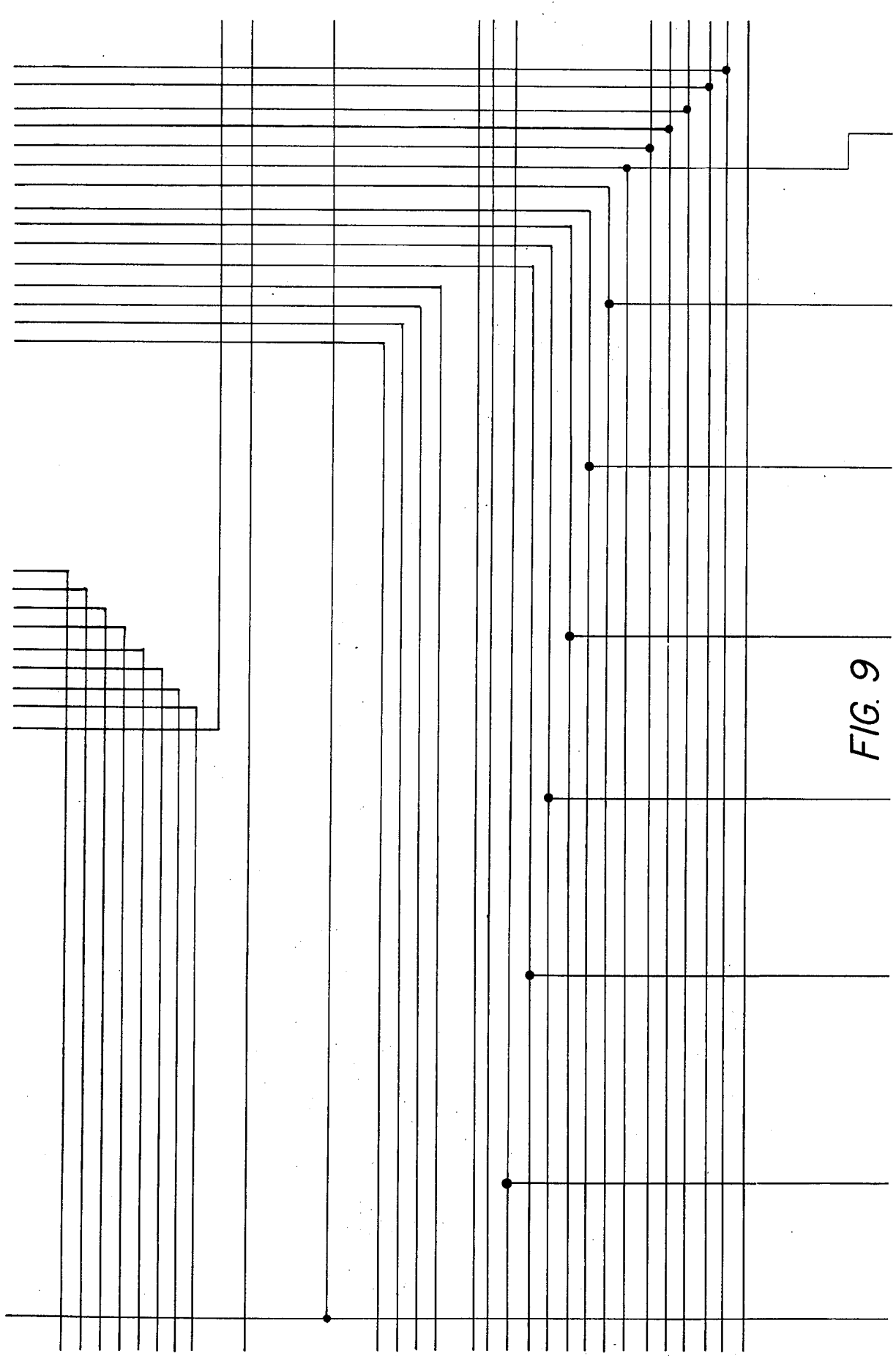
Figure 10:
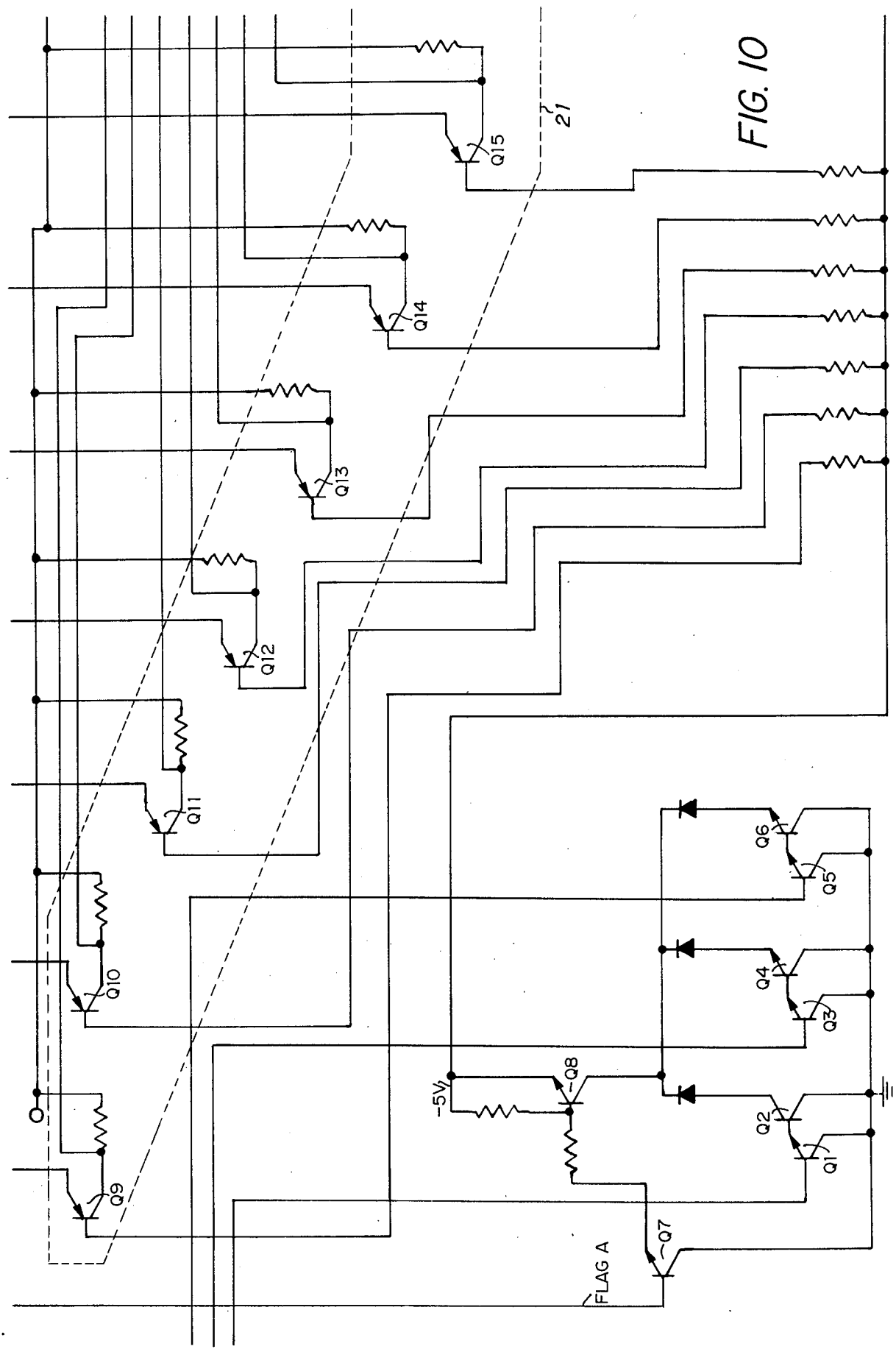
Figure 11:
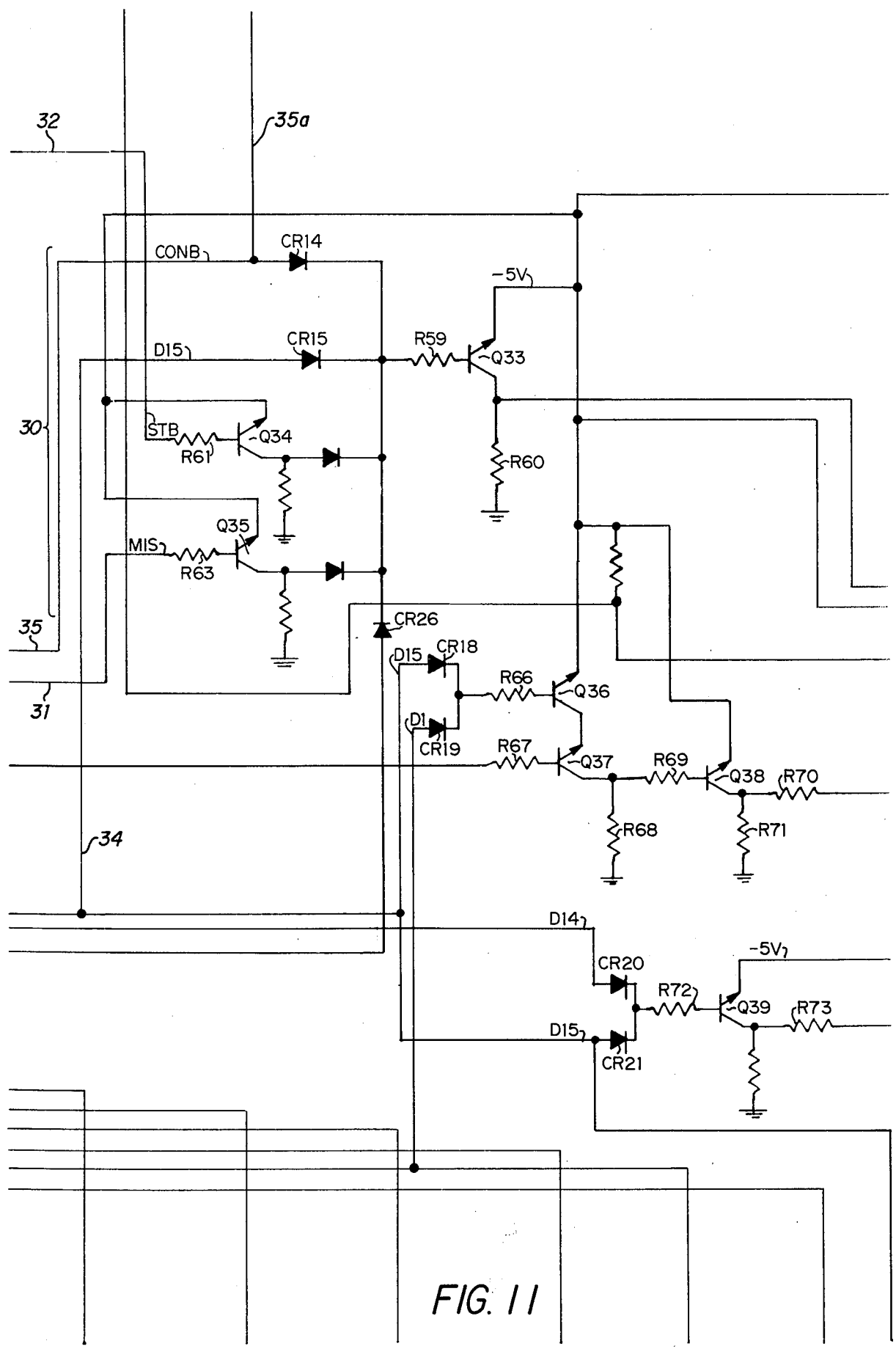
Figure 12:
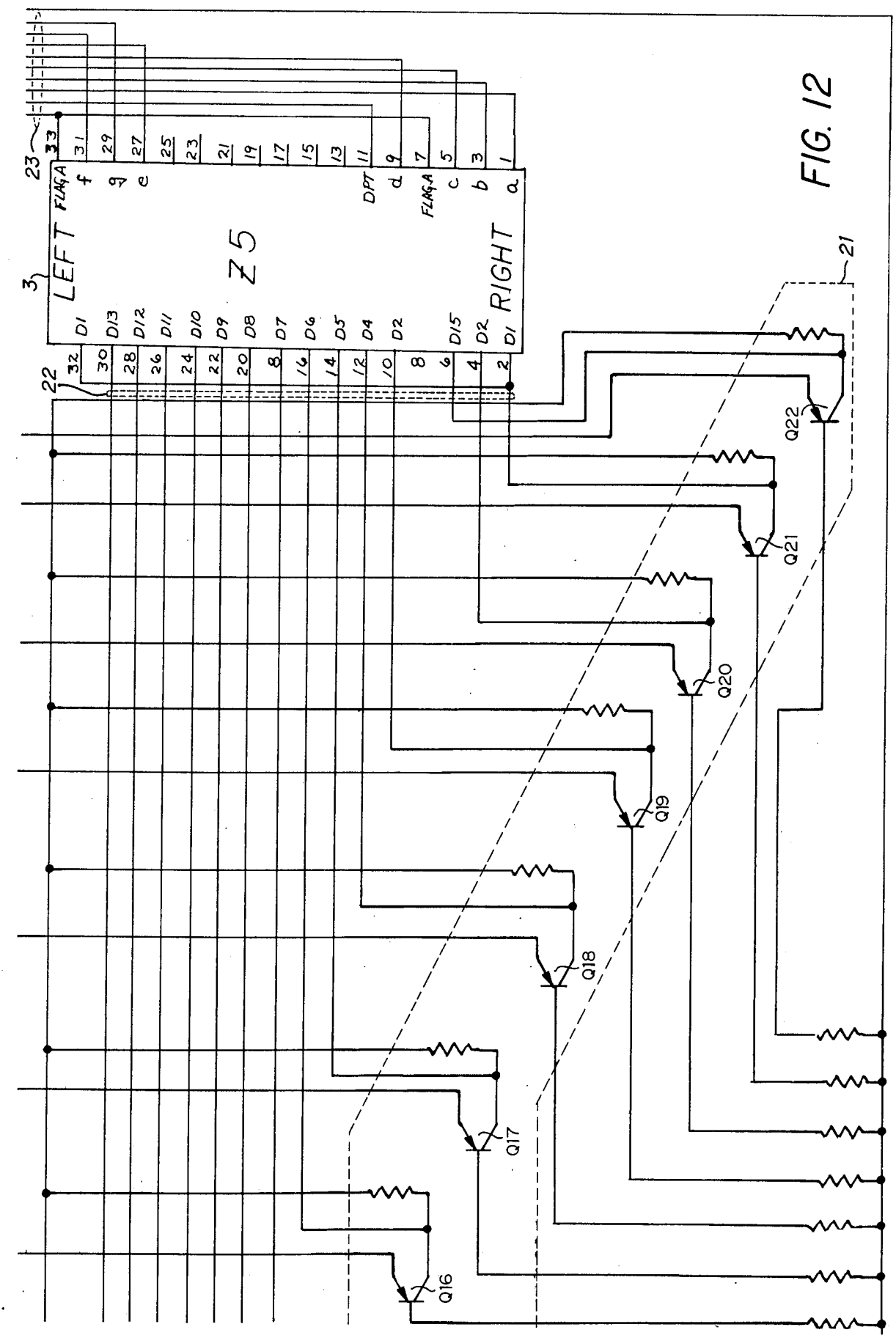
Figure 13:
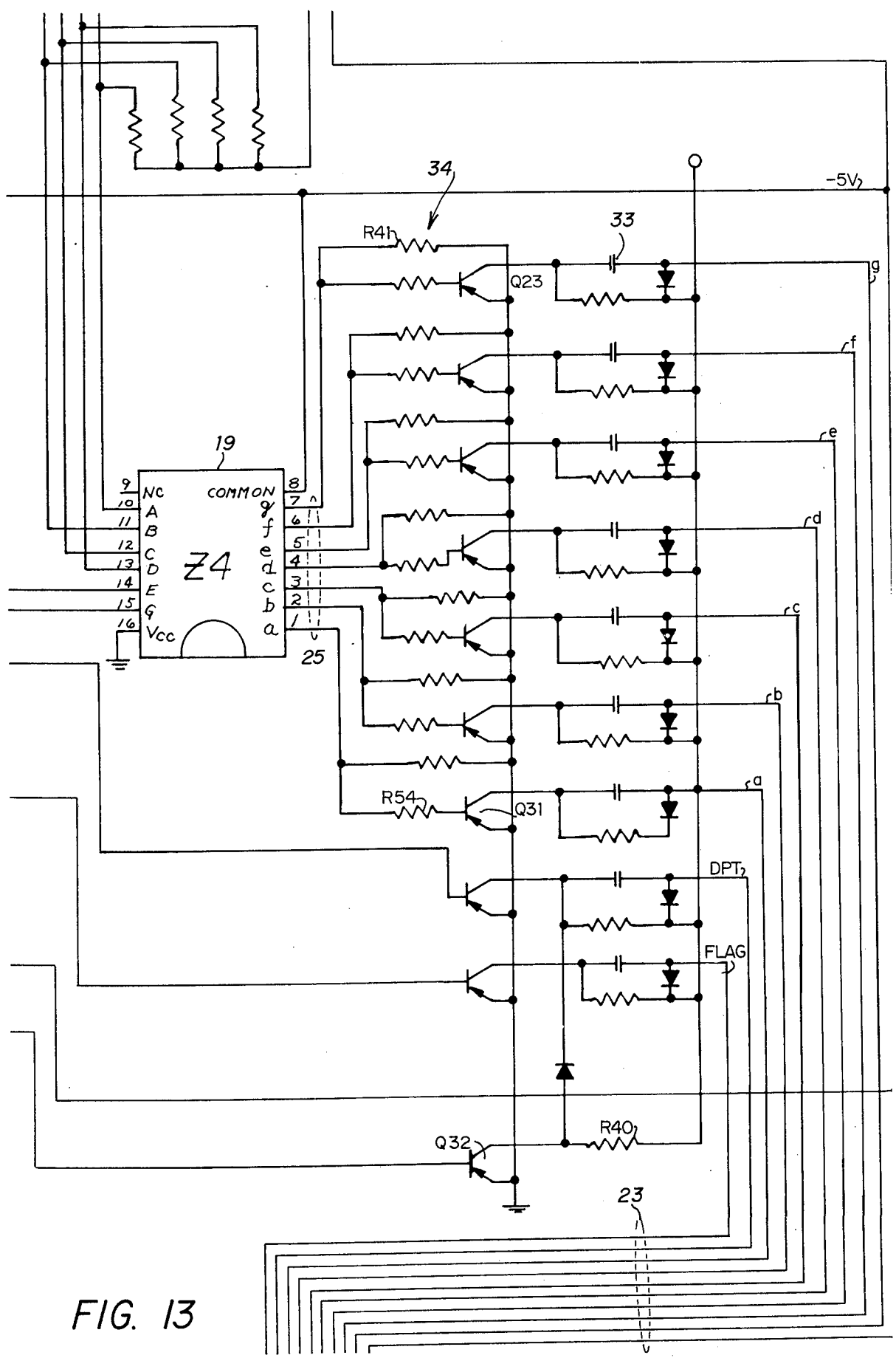

In FIG. 1 an electronic calculator 1 of the type which may employ features of this invention is shown in pictorial form. Calculator 1 is contained within a small housing 2 and has a display 3 and a keyboard 4. The display 3 may consist of up to fifteen digits or characters and may employ neon tubes, liquid crystal display units, arrays of light emitting diodes, or other display means. In a scientific calculator, the display may be 10 digits plus a two digit exponent for scientific notation in addition to annotators for both mantissa and exponent as well as overflow, entry error, etc. Ordinarily, each digit of the display 3 would be of the so called seven segment or eight segment variety with provisions for indicating a decimal point and comma for each mantissa digit. The keyboard 4 includes the usual set of 10 decimal number keys 4a with an additional set of keys 4b providing for hexadecimal numerical entry. The function keys include functions in set 4c of equal (=), plus (+), minus (−), multiply (×), divide (÷), to command scientific notation (EE), exchange contents of display with memory (XCH), Σ, store (STO) and recall contents of memory to display without clearing memory (RCL).

Two keys in set 4d provide for total clear logic (CL) and clear display only (CD). Four keys in set 4e provide for selecting operations in any of the three bases: decimal (DEC), octal (OCT) and hexadecimal (HEX). A fourth "key change number base" (CHB) is provided so that actuation thereof will automatically cause the system to change from one base to another. A set of indicator light emitting diodes (LED) 4f are provided and will be selectively illuminated upon actuation of the corresponding buttons DEC, OCT or HEX so that the display 4f will provide a direct indication as to the notation system for any display on the display 3.

Data or numbers are entered by the keys in sets 4a and 4b. Instructions are entered by the function keys in set 4c. Both the number and function keys serve to call to subroutines from an internal stored program to execute the desired entry or operation. Entries and intermediate and final results of calculations are indicated on the display 3.

Generally speaking, the construction and operation of the calculator may be understood by reference to the block diagram of FIG. 2 as reproduced and described in accordance with the above-identified U.S. Pat. No. 3,934,229.

FIGURE 2

FIG. 2 illustrates the expanded calculator system of this invention showing the data chip 5 and ROM chip 6 interconnected with the peripheral chips providing expanded calculator capacity. Data chip 5 generates a plurality of control signals to ROM chip 6, the set of ROM/register chips 7 of this invention, (providing for both increased data word storage and increased instruction word storage capacity), to an external 10 register chip set 8, providing external data word storage capacity, to an external programmer chip 10, providing a means for programming specific subroutines into the calculator externally, and to external printer chips 9 for controlling output printers 11. Output printers 11 may be of conventional design with adaptions to the printer chip 9, but preferably are of the thermal printer type or the drum printer type.

The control signals generated by the data chip 5 include the control signals:

CONTROL A (CONA) or inhibit increment for indicating that an interrupt is desired in the normal sequencing of the ROM to allow additional executions by the system before the next instruction word is to be executed;

CONTROL B (CONB) is indicative of the idle condition of the data chip, i.e., whether the data chip is actuatlly in the calculating mode (non-idle) or in the display mode (idle);

CONDITION (COND) indicates that a condition flag has been set indicating a comparison of the particular flags or desired digits of an instruction word;

FLAG A (FLGA) is the serial output of the flag register in the SAM at an output rate determined by COND;

STATE TIMES (S times) indicate the state timing (timing controlling data manipulation) of the data chip, sixteen of which state times generate a D time;

DISPLAY TIMES (D times) indicate which set state times of the program the calculator is currently executing, wherein sixteen S times constitute an instruction cycle, and the D times are generated in cycles of fifteen so that D times precess from the particular D time of the preceding cycle;

KEYBOARD INPUTS (K lines) are signals from the keyboard for entering externally commands to the data chip;

P REGISTER (PREG) indicates that the data chip is addressing ROM storage and indicates which ROM storage area is being addressed;

INSTRUCTION WORDS ($I_0$–$I_{12}$) indicate the particular instruction word stored in a particular ROM instruction storage unit;

EXTERNAL (EXT) indicates that the externl terminal on the data chip is either sending or receiving data;

STROBE (STBE) is a programmable signal determining the period of D times, herein preferably chosen as 15.

Referring again to FIG. 2, data chip 5 provides output information from register A and flag register A to a segment decoder 14. Such information is communicated as: position of the comma, position of the decimal point, actual data to be displayed from the "A" register, and data to be displayed from the flag A register. The segment decoder 14 is a conventional decode circuit for decoding the binary coded decimal output information for actuating the segment drivers 13. The segment drivers 13 comprise conventional driver circuits for actuating the above-mentioned displays 3, here shown to have a seven segment display per digit.

The data chip also provides D times to the digit drivers 12 for selectively scanning the digits of the display 3. Scanning of the display matrix is explained in detail in U.S. Pat. No. 4,074,351. In the preferred embodiment disclosed in said application there is provided a first set of D times from the data chip 5 and a second set of D times from the ROM chip 6, which combination of sets comprise a 15 D time cycle.

The data chip is responsive to the K information which is generated from the D time strobing of the keyboard input. This scanning of the keyboard is set forth in detail in U.S. Pat. No. 3,934,220.

ROM chip 6 is responsive to COND, CONA, PREG, STBE, IRGA, IRGB and the S times signals from the data chip 5 and generates in response thereto the instruction word $I_0$–$I_{12}$, the D times, and IRGA and IRGB to the data chip.

The ROM/register chip 7 of this invention allows expanded data and instruction word capacity. As explained in detail in U.S. Pat. No. 3,934,229, the ROM register chip is responsive to $I_0$–$I_{12}$ instruction words from the ROM, I/O information from the data chip, and S times, Flag A, STBE, CONA, CONB, PREG and COND command signals from the data chip.

The ten register chip 8 is another set of peripheral chips providing expanded data storage capacity to the calculator system of this invention. The 10 register chip is responsive to Flag A, CONB and I/O information from the data chip for providing recall data through the I/O lines in return to the data chip.

Printer chip 9 may be provided to respond to the I/O information from the data chip, the external, CONB, Flag A and STBE commands from the data chip for printing in accordance with data on the I/O lines.

The detailed description of the individual functional blocks as described in U.S. Pat. No. 3,934,229, is hereby incorporated by reference as needed.

FIGURES 3–14

Referring now to FIGS. 3–14, a composite drawing of the circuitry interconnecting five modules is illustrated. The Z1 chip 5 is of the type manufactured and sold by Texas Instruments Incorporated in its 200 Series and identified as Data Chip 0207A. The Z3 chip 6 is a ROM chip and is of the 300 Series being designated as Chip 0323.

The Z2 chip 7 is a ROM chip of the 400 Series and identified as Chip 0404. Unit Z4 is a decoder ROM of the type manufactured and sold by Texas Instruments Incorporated and identified as part No. 2N47102. The Z5 module 3 is a display unit, preferably of the type manufactured and sold by Burroughs and identified as Panaplex II.

Except as described hereinafter, the relationship between chips 5, 6 and 7, the decoder unit 19 and the display 3 are the same as described in U.S. Pat. No. 3,934,229.

In accordance with this invention, ROMs 6 and 16*b* are X512 word units programmed in accordance with the list set out in Tables I and II, respectively. The start and end addresses indicate the addresses of the first and last instruction in each row. For example, in TABLE II the instruction 15E6 is at address 000 and the instruction 1426 is at address 010, the instructions and addresses being in hexadecimal designation. The instruction 1F79 is at address 003 and instruction 1F31 is at address 00E.

TABLE I (Z3)

| START | END | IDENTI-FIER | COL-13 | 17 | 21 | 25 | 29 | 33 | 37 | 41 | 45 | 49 | 53 | 57 | 61 | 65 | 69 | 73 | 77 |
|---|---|---|---|---|---|---|---|---|---|---|---|---|---|---|---|---|---|---|---|
| | | | | | | | | | | | | OBJECT CODE IS RIGHTMOST 13 BITS | | | | | | | |
| 000 | 010 | T03HEX | 1E4A | 1F00 | 1F23 | 1F79 | 1E79 | 1F63 | 1F80 | 1085 | 1FA1 | 1FB1 | 1FA9 | 1F00 | 1F21 | 1F29 | 1F31 | 0894 | 0094 |
| 001 | 021 | T03HEX | 0839 | 089A | 0820 | 1F4B | 1FBB | 1F04 | 08E3 | 0806 | 1F4E | 001F | 1F15 | 1F95 | 085B | 1F0D | 285B | 1F06 | 0826 |
| 022 | 032 | T03HEX | 1F04 | 1036 | 1F11 | 1F09 | 1084 | 0A59 | 1086 | 1F63 | 1F33 | 1A21 | 1E2A | 1F5E | 1906 | 0A2B | 00EB | 0A7A | 1E31 |
| 033 | 043 | T03HEX | 0828 | 1F34 | 1F23 | 1FA1 | 1FA9 | 0800 | 1FE3 | 084E | 0A67 | 1A21 | 0840 | 1F23 | 1F34 | 1F2C | 0A2B | 1806 | 0B57 |
| 044 | 054 | T03HEX | 0356 | 0356 | 0356 | 0A59 | 0A72 | 0800 | 083B | DBF0 | 0862 | 1F24 | 1F4C | 1F84 | 089E | 0984 | 1F1B | 0982 | 08EB |
| 055 | 065 | T03HEX | 09B1 | 1F1B | 0983 | 0905 | 09B1 | 0866 | 18A1 | 1A26 | 0866 | 083E | 1F06 | 0062 | 0921 | 1E42 | 1E79 | 1D40 | 0062 |
| 066 | 076 | T03HEX | 1F3E | 1F7E | 007B | 1E79 | 1D40 | 0866 | 1E79 | 1D40 | 1EB2 | 1F86 | 1F29 | 0886 | 1EB2 | 1FF6 | 1FF0 | 1EA2 | 1E4A |
| 077 | 087 | T03HEX | 0119 | 1FE6 | 089C | 1E3A | .1EA2 | 1E79 | 1E5A | 1FF6 | 1F3E | 1F21 | 0869 | 1F7E | 1F31 | 1F29 | 1F31 | 1F76 | 1F75 |
| 088 | 098 | T03HEX | 1FF4 | 1587 | 0869 | 1E7E | 0892 | 1F23 | 1F2B | 1F33 | 1F3E | 086 | 0869 | 14AF | 0886 | 1F21 | 1E31 | 1031 | 1F64 |
| 099 | 0A9 | T03HEX | 0839 | 1F83 | 1F4C | 1F06 | 08A3 | 1F0C | 1F14 | 1F7C | 1B6F | 1F04 | 1FE6 | 0069 | 1084 | 1B87 | 1F63 | 1202 | 11A6 |
| 0AA | 0BA | T03HEX | 1FEE | 08AE | 1126 | 1126 | 1202 | 126F | 1F26 | 00CA | 426 | 1B02 | 17A6 | 00E4 | 14A6 | 14A6 | 1207 | 1036 | 0DBE |
| 0BB | 0CB | T03HEX | 14A6 | 14A6 | 00C1 | 1F7B | 1B02 | 08E4 | 1826 | 1426 | 1C1C | 426 | 1FE6 | 1F7E | 1B02 | 1BEF | 00CA | 1F36 | 1F4E |
| 0CC | 0DC | T03HEX | 00E0 | 15EF | 15EF | 15EF | 15C1 | 08E4 | 1826 | 1087 | 1F1C | 00E9 | 18A6 | 14A6 | 1B02 | 08DB | 1826 | 162F | 1587 |
| 0DD | 0ED | T03HEX | 106F | 1546 | 03E4 | 1266 | 12EF | 1246 | 1FBE | 1087 | 426 | 00E9 | 18A6 | 1726 | 11AF | 005B | 1E5A | 1566 | 1F1E |
| 0EE | 0FE | T03HEX | 08F0 | 1F15 | 1F0F | 08FF | 1F8F | 08F6 | 1B02 | 1F97 | 1F97 | 08FB | 11A1 | 08E4 | 1F97 | 11B4 | 0109 | 1EB2 | 08FB |
| 0FF | 10F | T03HEX | 1F8E | 0104 | 1B02 | 1F97 | 15EF | 14A1 | 1B66 | 0101 | 1244 | 0117 | 08FB | 1F8E | 08FB | 1F97 | 1F97 | 15EF | 15C6 |
| 110 | 120 | T03HEX | 0917 | 1541 | 0916 | 15E6 | 1F8F | 18A6 | 1546 | 095D | 1F64 | 091C | 15C1 | 08FB | 1B02 | 1F04 | 1F17 | 0111 | 1F11 |
| 121 | 131 | T03HEX | 1F09 | 0968 | 1EDA | 1F56 | 092F | 1E0A | 18A6 | 095D | 012F | 1E39 | 1F4C | 14FC | 092F | 1E5A | 1F04 | 1036 | 11A1 |
| 132 | 142 | T03HEX | 0934 | 1F00 | 14A1 | 0162 | 18A6 | 19A1 | 19A1 | 0944 | 1826 | 11A6 | 1E02 | 1F36 | 1566 | 19A1 | 013B | 126F | 0965 |
| 143 | 153 | T03HEX | 1566 | 1F0E | 0154 | 0949 | 1F0E | 0954 | 1826 | 0153 | 1F1C | 1F1C | 00E9 | 1BE6 | 1BE6 | 12C6 | 1BE6 | 095E | 1F0D |
| 154 | 164 | T03HEX | 1121 | 1F15 | 1EF | 15E6 | 1B66 | 1F86 | 1826 | 1286 | 1F91 | 1BE6 | 08A6 | 005B | 11AF | 1F3B | 1086 | 1F14 | 1F0C |
| 165 | 175 | T03HEX | 1F06 | 1906 | 0204 | 1F4E | 03E7 | 0842 | 1F66 | 1087 | 1F46 | 1C26 | 1BE6 | 1B02 | 1F54 | 1F46 | 0977 | 1F26 | 017C |
| 176 | 186 | T03HEX | 0A85 | 1F26 | 017C | 1F2E | 0356 | 14A1 | 0101 | 1244 | 1F63 | 1F89 | 1F89 | 090D | 1834 | 1834 | 1E41 | 19B4 | 1005 |
| 187 | 197 | T03HEX | 1F64 | 1EAA | 11B1 | 1EOA | 107D | 1E1A | 095D | 0352 | 1E31 | 0204 | 1F56 | 1F84 | 1A31 | 10F4 | 1574 | 1024 | 18B4 |
| 198 | 1A8 | T03HEX | 01AA | 1085 | 1E31 | 1F63 | 1FB2 | 1FF3 | 15FD | 1F5E | 1E31 | 1039 | 1EA2 | 1EA2 | 1EA2 | 1904 | 1037 | 10FD | 1EA2 |
| 1A9 | 1B9 | T03HEX | 1E3A | 1003 | 19B4 | 18B1 | 1039 | 1F64 | 1FE3 | 1A05 | 1FE3 | 09A4 | 1E41 | 1FDB | 1F64 | 1A39 | 1EAA | 14A1 | 157D |
| 1BA | 1CA | T03HEX | 1F19 | 1003 | 1606 | 1F43 | 01AA | 1935 | 1F43 | 107D | 0919 | 1E1A | 1E41 | 0063 | 1EB2 | 1F1E | 09D2 | 10FD | 09D1 |
| 1CB | 1DB | T03HEX | 1F3B | 15C1 | 1202 | 12C1 | 0161 | 0968 | 1FOD | 15FD | 107D | 1A05 | 1F14 | 09AB | 1F13 | 1F0F | 09DF | 09D2 | 09EA |
| 1DC | 1EC | T03HEX | 0161 | 1F0D | 16A1 | 0923 | 01DD | 12C6 | 0586 | 1B20 | 1527 | 1F17 | 1F14 | 01D8 | 01EB | 09FB | 1426 | 1BD4 | 09EA |
| 1ED | 1FD | T03HEX | 1B54 | 01EF | | | 01AA | 1BEF | 14A1 | 1287 | 1284 | 1481 | 0123 | 01D8 | 0123 | 15E6 | 1CB4 | 01F7 | 1546 |
| 1FE | 1FF | T03HEX | 09FB | 15C6 | | 1566 | | | 09EB | 1826 | | 09EB | 15F4 | | | | | | |

TABLE II (Z2)

OBJECT CODE IS RIGHTMOST 13 BITS

| START | END | IDENTIFIER | COL-13 | 17 | 21 | 25 | 29 | 33 | 37 | 41 | 45 | 49 | 53 | 57 | 61 | 65 | 69 | 73 | 77 |
|---|---|---|---|---|---|---|---|---|---|---|---|---|---|---|---|---|---|---|---|
| 000 | 010 | T03HEX | 15E6 | 15E6 | 15EF | 18A6 01FD | 15E6 | 1085 | 18A6 | 18A6 | 15E6 | 18A6 | 1F06 | 022E | 1726 | 1726 | 1426 | 1F2E | 0215 | 1426 |
| 011 | 021 | T03HEX | 1F36 | 0215 | 17A6 1426 | 15E6 | 1286 | 1BE6 | 1241 | 0A1C | 1426 | 1286 | 1225 | 1B7D | 1884 | 18B1 | 0A17 | 1B86 |
| 022 | 032 | T03HEX | 1BFD | 123E | 1B66 1834 | 19B1 | 0222 | 1236 | 1566 | 1F44 | 1F5C | 1FBE | 1F53 | 0923 | 1F84 | 1F64 | 1E09 | 1DBF |
| 033 | 043 | T03HEX | 0A37 | 1F29 | 1F31 1F21 | 1F0C | 1FA9 | 1FB1 | 1FA1 | 0E3 | 15E6 | 18A6 | 1FBE | 0249 | 1027 | 1F0E | 0244 | 18A6 |
| 044 | 054 | T03HEX | 14A1 | 0257 | 11A1 0A50 | 1086 | 1CA1 | 08E3 | 18A1 | 0A04 | 15E6 | 18A6 | 18A6 | 0A49 | 1F0E | 0A55 | 15E6 | 0A44 |
| 055 | 065 | T03HEX | 18A6 | 0A53 | 102E 0A49 | 1E21 | 1A04 | 1A04 | 1F63 | 1026 | 1F64 | 1F5E | 1F5E | 0A2B | 0A2B | 103E | 11A6 | 1F5C |
| 066 | 076 | T03HEX | 0A60 | 1E39 | 1E1A 1A04 | 1086 | 1E1A | 1E1A | 1A21 | 1E2A | 1031 | 1E19 | 1906 | 0A5C | 1F5B | 1E1A | 1A21 | 1027 |
| 077 | 087 | T03HEX | 1F91 | 1F89 | 0832 1F26 | 1F7C | 1F63 | 0A80 | 1F2B | 0836 | 1E2A | 1F2C | 1704 | 0834 | 1F33 | 1A04 | 1035 | 1F94 |
| 088 | 098 | T03HEX | 1F83 | 1F0E | 1A85 02A3 | 1904 | 1F24 | 0A9A | 02A3 | 1F63 | 0836 | 1F2E | 1F2E | 1634 | 1634 | 0836 | 0123 | 14B7 |
| 099 | 0A9 | T03HEX | 1404 | 16B1 | 0A9F 1574 | 1554 | 18B4 | 11B4 | 1104 | 0A21 | 18B4 | 0A8E | 1704 | 1734 | 1805 | 0AA0 | 1734 | 14B4 |
| 0AA | 0BA | T03HEX | 12B4 | 1904 | 1037 1002 | 1285 | 0A9A | 1434 | 122C | 1F89 | 1F89 | 0AAB | 02B9 | 11B4 | 0ABB | 1F2E | 02AA | 0346 |
| 0BB | 0CB | T03HEX | 18B4 | 0AB3 | 11B4 1134 | 1904 | 1F1C | 18B4 | 1134 | 18B4 | 18B4 | 1F0E | 16A1 | 0AC9 | 1566 | 1F0B | 1284 | 1AB9 |
| 0CC | 0DC | T03HEX | 18B4 | 1286 | 1F0C 09C7 | 152C | 1586 | 1203 | 1C36 | 1C34 | 1203 | 0346 | 14F4 | 0AD8 | 18B4 | 0AC5 | 1106 | 1B24 |
| 0DD | 0ED | T03HEX | 09C7 | 1706 | 1726 1F2E | 02E4 | 14A6 | 1904 | 1527 | 1906 | 1906 | 18A6 | 1BEF | 0AD8 | 10EF | 0AD3 | 1537 | 12F4 |
| 0EE | 0FE | T03HEX | 1286 | 1287 | 106F 1426 | 12D4 | 1254 | 14A6 | 10EF | 1906 | 126F | 18A6 | 14A6 | 0AFB | 0AFB | 1527 | 1BF4 | 1B74 |
| 0FF | 10F | T03HEX | 1254 | 1570 | 1506 0310 | 1003 | 0AF1 | 0B09 | 1134 | 1134 | 1237 | 030C | 14A6 | 1566 | 18A6 | 1586 | 1B74 | 0AD1 |
| 110 | 120 | T03HEX | 155D | 1B4C | 1904 1586 | 0B15 | 18B1 | 1CA6 | 1566 | 1134 | 0B0C | 0B1A | 11B4 | 0B0C | 1A2C | 1546 | 1524 | 1003 |
| 121 | 131 | T03HEX | 18B1 | 0B28 | 11B4 0B25 | 18A6 | 1C36 | 0338 | 1134 | 1566 | 0B23 | 0B2B | 18A6 | 0B15 | 1F4E | 1906 | 18A6 | 1134 |
| 132 | 142 | T03HEX | 1826 | 0B31 | 10F4 1A24 | 1074 | 1A84 | 1003 | 123E | 1904 | 1F4C | 1F4C | 1084 | 1134 | 12C6 | 11B4 | 1F4C | 0B43 |
| 143 | 153 | T03HEX | 12D1 | 1274 | 034A 1F6B | 1F84 | 1F0C | 0BDF | 1237 | 123E | 106F | 106F | 1084 | 1A86 | 0B48 | 14A6 | 1246 | 1B24 |
| 154 | 164 | T03HEX | 1F89 | 0AAF | 1A86 1706 | 1F99 | 1805 | 1F16 | 035D | 1237 | 1726 | 153E | 1A86 | 1A86 | 1F0B | 0AEC | 1B02 | 1B74 |
| 165 | 175 | T03HEX | 12F4 | 1287 | 1257 14A6 | CB67 | 1284 | 1536 | 1074 | 1254 | 1904 | 1726 | 14A6 | 18A1 | 1F0E | 14A6 | 10F4 | 1F0B |
| 176 | 186 | T03HEX | 1284 | 1134 | 18B4 0B71 | 1F89 | 1087 | 1286 | 1BE6 | 1904 | 1904 | 1904 | 14A6 | 0B71 | 0377 | 11B4 | 0B78 | 1B2E |
| 187 | 197 | T03HEX | 1904 | 18B4 | 1B87 1227 | 1B6F | 152C | 1087 | 1557 | 1557 | 1227 | 18B4 | 18B4 | 1286 | 18B4 | 0B7F | 10EF | 1574 |
| 198 | 1A8 | T03HEX | 1C24 | 15E6 | 1CB4 15D4 | 1537 | 1584 | 18B4 | 0B8C | 156F | 156F | 18A1 | 1BE6 | 1BE6 | 1557 | 1557 | 1286 | 03AB |
| 1A9 | 1B9 | T03HEX | 14B4 | 14B4 | 1574 1574 | 1537 | 1236 | 1527 | 122D | 1F8E | 1F1C | 152E | 0B71 | 1537 | 1286 | 1734 | 18A1 | 1BE4 |
| 1BA | 1CA | T03HEX | 1236 | 152C | 1CB4 1107 | 1F8C | 1F0C | 1203 | 11B4 | 1F1C | 1203 | 1906 | 0BB5 | 1F1B | 1536 | 1704 | 16A1 | 0BCD |
| 1CB | 1DB | T03HEX | 1566 | 0BC9 | 1F1E 0BD0 | 1525 | 1B02 | 0BD5 | 0BD5 | 03D7 | 1566 | 1203 | 1F4B | 1F4B | 1502 | 1F14 | 1AB9 | 1F13 |
| 1DC | 1EC | T03HEX | 1F8F | 1F19 | 1906 1F6E | 1F4C | 1F6C | 16A1 | 1F86 | 1F84 | 11A6 | 0923 | 09C7 | 1F1E | 0BEB | 153E | 0BCD | 15F4 |
| 1ED | 1FD | T03HEX | 15F4 | 1F8F | 0BC0 1F2B | 1F24 | 1F34 | 0A2B | 0BD5 | 0126 | 0000 | 0000 | 0000 | 0000 | 0000 | 0000 | 0000 | 0000 |

The invention functions as both a desk top and portable unit to afford the operator the optimum in operational flexibility. It performs number base conversions (decimal, octal and hexadecimal) as well as the four basic arithmetic operations with floating point decimal. In addition, the mechine has a memory, memory sum, provides a visual indication of calculator number base and is programmed to give calculation overflow and entry error indications.

The display is a 14 digit ¼ inch gas discharge unit. The display format is scientific notation with a 10 digit mantissa and two digit exponent. Both mantissa and exponent have sign digits immediately preceding their respective locations.

Keyboard 4 involves a matrix having as inputs a set of 15 D lines and outputs as a set of seven K lines. The keys of the numerical set 4a are all associated with the output line KN. The alphabetic keys of set 4b are all associated with output line KP. The keys of number base selection set 4e are all associated with output line KR. The HEX key is associated with line D13. The OCT key is associated with line D10, the DEC key with line D11 and the change base key is associated with the KQ output line and the D1 input line.

In the foregoing, D lines serve as inputs to the keyboard and the K lines serve as output lines from the keyboard. The states on the D line are generated in the MOS chips in the calculator. The K lines serve as inputs to the MOS chips. It will be noted that the K lines are connected as input lines to the arithmetic Z1 chip 5. Fur of the D lines come from chip c. The remainder of the D lines come from Z3 chip 6.

A set 21 of display anode drivers Q9–Q22 serves to actuate Z5 module 3. The drivers are each connected to one of the D lines. Each of the D lines except D14 serves as a source for the unit 21. The arrangement for control of the seven segment display in Z5 unit 3 is generally well known on being embodied in calculators of the type manufactured and sold by Texas Instruments Incorporated of Dallas, Texas, and are identified as SR20 and SR22 as well as others.

More particularly, output lines from unit 21 are connected by way of lines 22 to the respective anodes in the display unit 3. An additional set of control lines 23 are connected to the cathodes of the display unit 3.

The Z4 decoder unit 19 has data input lines 24 which, extend from the chip 5. Unit 19 is a five input 32 word unit. Words 16–25 are used to decode the numerics (0–9), respectively, and words 26–31 decode the alphas (A–F), respectively.

Inputs A, B, C, D correspond to chip 5 outputs A, B, C, D, respectively, while input E serves as a gate control to select either the first or second set of 16 word addresses. Data is decoded in unit 19 and applied to the cathode driver units by way of lines 25.

In accordance with the present invention, the system is provided with the key set 4b and the key set 4e in addition to keys found in other calculators. In order to accommodate the functions involved in operating in either decimal, octal or hexadecimal and to change automatically from one number base to another, the programming in chips 6 and 7 is unique an is related to the capability provided in keyboard 4.

Further, because of the unique characteristics of the system to accommodate operations in a plurality of number bases, a blanking circuit 30 is provided to respond to the outputs of the chips 5, 6 and 7 to control the display.

Transistor Q33 and diodes CR14, CR15, CR16 and CR17 form a discrete four input NOR gate while transistors Q34 and Q35 function as inverters. The display is blanked during D15 time in that the zero suppression signal gives an ∓enable" command during this time. It is blanked during the calculate or active mode. CONB switches from $V_{dd}$ to $V_{ss}$ to blank the display 3.

The output of chip 5 is not zero suppressed but rather a zero suppression signal is provided at the miscellaneous output (MIS). This signal drives the decoder to the first 16 words of the address whenever the A–D outputs of chip 5 are to be suppressed.

The zero suppression signal occurs for the full 16 state times of the digit period, i.e., it enables for both the preceding and following blanking intervals. Because it is during the blanking interval that the segment driver capacitors, such as capacitor 33, are charged, a method of creating a blanking interval is necessary. The strobe (STB) output of chip 5 provides such an interval and activates pin E of decoder 19 via transistors Q34 and Q33.

The resistors 34 from outputs Y1 through Y8 are external pull up resistors for the open collector unit 19.

More particularly, in the circuit 30, a first input line 31 labeled MIS (miscellaneous) extends from M15 terminal of chip 5. State on line 31 is a one when a given character is to be displayed on unit 3. It is zero for no display. Line 31 is connected to the base of transistor Q35 and thence to the base of transistor Q33 the output of which is connected to the E input terminal of decoder 19. Data lines 24 connected to the input terminals A–D of decoder 19. When the input E of decoder 19 is zero, then all of the output lines 25 are coded to zero. Thus, any time any given digit is to appear on the display unit 3, the miscellaneous line 31 is in a one state.

A STB (strobe) line extends from the strobe output terminal on chip 5 and extends to transistor Q34. The strobe signal on transistor Q34 allows capacitors, such as the capacitor 33, to recharge once each D time so that the display on unit 3 will have uniform brightness.

The D15 output appears on line 34 and is applied to transistor Q33. The D15 signal on line 34 counteracts any possibility of extraneous signals being displayed on unit 3 when line 31 goes high during the same time period as D15.

CONB is a signal from chip 5. It is low when chip 5 is in the idle mode. It is at the one state when chip 5 is in the active mode, as when entering data or calculating.

CONB prevents any display when chip 5 is in the active mode. It permits display when the chip 5 is in the idle mode.

Transistors Q32, Q39 and diodes CR13, CR20, CR21 form a discrete NOR gate and level clamp which constitutes the decimal blanking circuit. During digit periods D14 and D15 the collector of Q30 is clamped at $V_{ss}$ and is unable to double the high voltage required for tube ionization in display unit 3. Otherwise, the collector is free to approach the necessary high voltage, performing doubler action.

Flag or sign blanking is accomplished in a circuit including a discrete AND gate formed by Q36, Q37 and Q38. Because an undesired signal is always present on the Flag line (light driver information), the sign driver is enabled during D1 and D15 digit times only. These correspond to the mantissa and exponent signs, respectively.

An oscillator 36 supplies primary timing pulses $\phi_1$ and $\phi_2$. A line 35a applies the CONB state to a frequency control input terminal of a clock oscillator 36. Clock oscillator 36 is of conventional construction and operation. The two outputs $\phi_1$ on line 36a and $\phi_2$ on line 36b. The oscillator 36 has its frequency primarily controlled by capacitors 36c and resistors 36d. When CONB is low or zero, the system is in the display mode and oscillation produces the clocks $\phi_1$ and $\phi_2$ at a relatively low frequency, typicaly of the order of about 50 KHz. However, when line 35a is high, the system is in the calculator mode. Transistor 36e effectively connects resistors 36f in parallel with resistors 36d and thus the frequency of the oscillator is substantially increased. The increase typically may be to a frequency of the order of over 200 kc. By this means when the system is in the calculate mode, it runs at a relatively high speed and thus is in an efficient state during calculation. In a display mode at the lower speed, the calculator will dissipate less power and still permit the production of a suitable display in unit 3. At low speed, power usage is minimized and at high speed calculation time is minimized.

The clock pulses $\phi_1$ and $\phi_2$ and the specific manner in which they function to control the calculator are as described in U.S. Pat. No. 3,934,229. Briefly, clock $\phi_1$ comprises a negative going pulse of length equal to one-fourth the oscillator period. Clock $\phi_2$ is a like waveform 180° out of phase with clock $\phi_1$. CONB is thus a control signal that exercises major control of the various system components. It inhibits display, changes clock rate while controlling the interrelation between chips 5, 6 and 7.

It will be appreciated that an alterable base calculator has been provided that allows the user to perform or execute calculations in any of the three bases — octal, hexadecimal or decimal. The calculator also provides means for converting from one of these bases to the other. That is, it allows the user to perform functions such as add, subtract, multiply and divide in any of the three bases as well as providing means for converting from any one base to the other base. A conversion algorithm stored in a permanent store memory converts a data input from its present base format into the base format of the calculator, preferably hexadecimal, and them converts for output the result of the manipulations to possibly another desired base format, all of which is controlled by dedicated keyboard inputs.

Having described the invention in connection with certain specific embodiments thereof, it is to be understood that further modifications may now suggest themselves to those skilled in the art and it is intended to cover such modifications as fall within the scope of the appended claims.

What is claimed is:

1. A multiple base calculator system comprising:
   (a) keyboard entry means for entering function commands, numeric data in a plurality of different number bases, and a decimel point key for separating the integer and fractional parts of said numeric data;
   (b) display means for visually displaying numeric data in said plurality of different number bases, and
   (c) semiconductor integrated calculator circuit means including:
      (i) memory means for storing said numeric data in the inputted number base, said memory means being coupled to said keyboard entry means for receiving numeric data entered by said keyboard means;
      (ii) an arithmetic unit coupled to said memory means for performing arithmetic operations on both the integer and fractional parts of said numeric data only in a first number base in response to instruction commands;
      (iii) an addressable permanent store read-only-memory means coupled to said arithmetic unit and having stored therein a plurality of groups of instruction commands for controlling the operation of said arithmetic unit, at least one of said groups being arranged to control said arithmetic unit to change the number base of the data stored in said memory means from said inputted number base to said first number base for performing arithmetic operations thereon and at least another of said groups being arranged to change the number base from said first number base to said inputted number base for displaying numeric data in said inputted number base, whereby numeric data is enterable in a selected one of said number bases and numeric data displayed in a selected one of said number bases;
      (iv) keyboard selection means for indicating to said calculator system the particular one of said plurality of number bases of said numeric data entering said system by means of said keyboard means; and
      (v) control means coupled to said keyboard selection means and to said addressable read-only-memory-means for addressing at least one of said groups in response to the base selection indicated by said keyboard selection means.

2. The system of claim 1 wherein said first number base is the hexadecimal number base.

3. The system of claim 1 wherein said keyboard selection means is selectable to indicate to said calculator system to change data stored in said memory means to octal base.

4. The system of claim 1 wherein said keyboard selection means is selectable to indicate to said calculator system to change data stored in said memory to hexadecimel base.

5. The system of claim 1 wherein said first number base is decimal and said inputted number base is hexadecimal.

6. The system of claim 5 wherein said keyboard selection means comprises at least one key disposed in the vicinity of said keyboard.

7. The system of claim 5 wherein said plurality of number bases further includes octal.

* * * * *